Oct. 8, 1957  W. B. GUGGI  2,809,339
MOTOR CONTROL CIRCUIT
Filed May 6, 1955
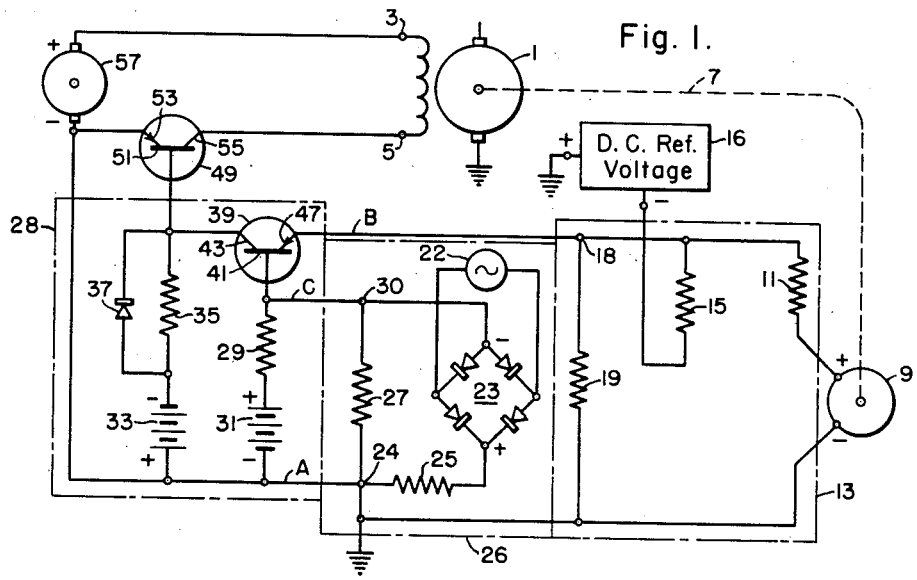
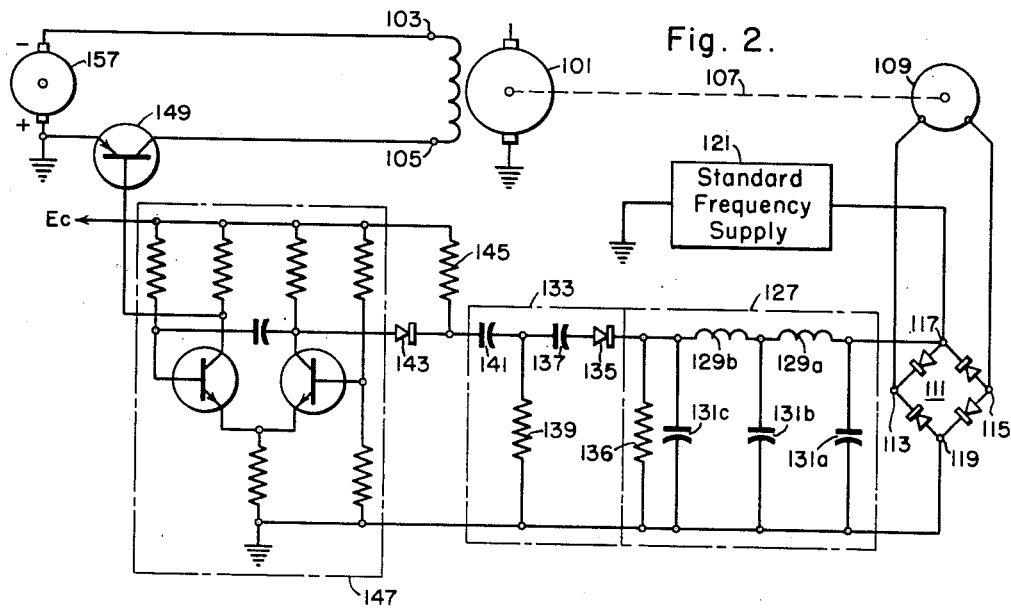
Fig. 3A.
Fig. 3B.
INVENTOR
Walter B. Guggi.
BY
Paul E. Friedemann
ATTORNEY

United States Patent Office 2,809,339
Patented Oct. 8, 1957

2,809,339

MOTOR CONTROL CIRCUIT

Walter B. Guggi, Snyder, N. Y., assignor to Westinghouse Electric Corporation, East Pittsburgh, Pa., a corporation of Pennsylvania Application May 6, 1955, Serial No. 506,472

7 Claims. (Cl. 318—327)

This invention relates to motor control systems and more particularly to speed regulating systems for direct current motors. In many applications of direct current motors it is desired to regulate motor speed under loads which may vary over extremely wide ranges. It is desirable to maintain the speed control circuitry as simple as possible and to keep the system as failproof as possible in view of the unfavorable operating conditions under which said motors must function in many industrial applications thereof.

One object of my invention is to provide a speed regulating system for a direct current motor utilizing a minimum number of component parts.

Another object is to provide a speed regulating system for a direct current motor utilizing a transistor switch as a control element thereof.

Still another object is to provide such a speed regulating system which is adapted to regulate motor speed within very close limits.

A further object is to provide such a regulating system having a very short time-response characteristic.

Other objects and features will become apparent upon consideration of the following description of my invention when taken in connection with the accompanying drawings, wherein:

Figures 1 and 2 are electrical schematic diagrams of two embodiments of my invention; and Figs. 3a and 3b are wave form representations of the output voltage of a Class C amplifier-limiter of Fig. 1 which is useful in understanding the operation of the circuitry of Fig. 1.

According to one aspect of my invention, I derive an electrical characteristic which is indicative of the magnitude of deviation of the speed of the D. C. motor from a reference speed. The motor field winding is connected to a source of power through the emitter-collector current conduction path of a junction transistor normally biased either to collector current saturation or to cut-off. Assuming that the transistor is biased to saturation, the average field current (and thus the motor speed) is varied by switching off the collector current for varying periods in accordance with the magnitude of the aforementioned electrical characteristic. Thus a decrease in motor speed will be immediately compensated by decreasing the average field current sufficiently to bring the speed up to its original value. Similarly, assuming the transistor is biased to cut-off, the speed is regulated by switching the transistor to saturation.

In more specific aspects of my invention, the electrical characteristic (either frequency or voltage) is derived from a tachometer driven by the D. C. motor, and is compared against a characteristic derived from a standard reference source. A difference signal is thereby produced which is functionally related to the motor speed deviation from the full field speed at zero load. The magnitude of the difference signal is used to vary either the pulse-duration or the pulse frequency of the output of a pulse generator. The pulse duration is varied when the difference signal is expressed in terms of variable voltage, and the pulse frequency is varied when the difference signal is expressed in terms of variable frequency. The output of the pulse generator is coupled between the base and an adjacent electrode of the transistor so as to drive the transistor to collector current cutoff or saturation as described above.

For a more detailed discussion concerning the use of a transistor as a switch, reference may be had to the co-pending application of R. L. Bright and G. H. Royer titled "Transistor Power Control Circuits," Serial No. 420,904, filed April 5, 1954, and assigned to the assignee of the present invention.

With reference now to Fig. 1, there is shown a direct current motor 1 having field winding terminals 3 and 5. Field terminal 3 is connected directly to the positive terminal of a direct current power source 57 while field terminal 5 is connected to the negative terminal of the power source through the emitter-collector current conduction path of transistor 49. The armature voltage may be derived from any convenient source of direct current. Assuming that the transistor 49 is of the p-n-p type, the negative terminal of source 57 will be connected to the emitter electrode 53 and motor field terminal 5 will be connected to the collector electrode 55.

The output shaft of motor 1 drives a D. C. tachometer generator 9 through a mechanical connection 7. The output voltage of this generator is preferably a direct function of its speed. A direct current reference source 16 is provided, the output voltage of which is maintained as unvarying as possible. This reference voltage source 16 may be an extremely well regulated D. C. power supply or a standard cell. The positive terminal of reference voltage source 16 is connected to ground. The voltage outputs of tachometer generator 9 and reference source 16 are algebraically combined by circuit 13 in such a manner that the voltage output of the additive circuit is equal to the difference between the absolute magnitudes of the voltages of generator 9 and reference source 16. The negative terminal of reference source 16 is connected to terminal 18 of resistor 19 through resistance element 15 while the positive terminal of tachometer 9 is so connected through resistor 11. The positive terminal of source 16, the negative terminal of source 9 and the other terminal of resistor 19 are connected together and to ground.

A triangular pulse generator 26 is provided having output terminals 24 and 30. This triangular pulse generator comprises an alternating current source 22 which is coupled to the input terminals of a bridge-type full wave rectifier 23. The output terminals of rectifier 23 are applied across serially connected non-linear resistor 25 and linear resistor 27. The non-linear resistor 25 may be a varistor or a similar type of resistance element, the magnitude of the resistance of which is an inverse function of the voltage thereacross. The voltage wave appearing across linear resistor 27 will approach a triangular wave. The advantage of this type of triangular wave generator is the negative feedback requirements generally associated with other types of triangular wave generators such as differentiating amplifiers is avoided. A Class C amplifier-limiter network 28 is provided, the function of which is to amplify the triangular-wave voltage and to vary the duration of the output voltage therefrom in accordance with the amplitude of the output voltage of additive network 13 appearing across resistor 19 and to limit the amplitude of the triangular signal so that an essentially square wave voltage pulse is thereby derived. This amplifier limiter network comprises a p-n-p type junction transistor 39, the base electrode 41 of which is connected to ground through resistor 29 and potential source 31, and the collector electrode 43 of which is connected to ground through resistor 35 and potential source 33. The negative terminal of source 33 is connected to resistor 35 while the positive terminal of source 31 is connected to resistor 29. A Zener diode 37 is connected across resistor 35 to limit the magnitude of the voltage pulses appearing thereacross. The output voltage of triangular wave generator 26 is coupled to the class C amplifier by connecting output terminal 30 to base electrode 41 and output terminal 24 to ground. Similarly, the output of additive network 13 is connected to the class C amplifier by connecting output terminal 18 to emitter electrode 47. The output voltage of the amplifier limiter network 28 is connected between base 51 and emitter 53 of transistor 49, emitter 43 of transistor 39 being directly connected to base 51.

With zero output voltage appearing between output terminal 18 of additive network 13 and ground, the output of the class C amplifier would be a triangular wave such as shown by the solid lines of 3a were it not for the action of Zener diode 37. When the Zener voltage of the diode is reached, however, the diode will conduct to limit the amplitude of the voltage appearing across resistor 35 as shown by the dotted lines of Fig. 3a. Assuming now that additive network 13 is producing an output voltage such that terminal 18 is positive with respect to ground, the Class C amplifier accordingly will be biased so that the peak amplitude of the triangular wave appearing at the output of the Class C amplifier will be limited and the conduction period of the Class C amplifier will be decreased as shown in Fig. 3b. The Zener diode will likewise conduct as soon as the Zener voltage is reached to produce a wave form such as is shown by the dotted lines of Fig. 3b. Therefore, a voltage wave form appears across resistor 35 which is essentially a square wave the duration of which varies inversely as the amplitude of the output voltage of additive network 13.

In operation, let it be assumed that motor 1 is running at its operating speed such that the output voltage of tachometer generator 9 equals the output voltage of reference voltage generator 16. There will be zero voltage appearing at output terminal 18 of network 13 and the transistor 49 will be biased to saturation substantially at all times. If the speed of motor 1 drops, however, the output voltage of tachometer generator 9 will accordingly decrease and terminal 18 will become negative with respect to ground by an amount equal to the difference in the output voltages of tachometer 9 and reference voltage generator 16. The duration of the output pulses appearing across resistor 35 will accordingly decrease and transistor 49 will be biased to cutoff during a portion of each cycle of triangular wave generator 26. Therefore, the average current through the field winding of motor 1 will decrease and the motor will increase in speed until the output voltage of tachometer 9 again equals the output voltage of reference generator 16. In effect, we have a compensating network whereby a decrease in motor speed will almost instantaneously result in a decrease in motor field current to bring the motor back up to its operating speed.

In the embodiment of Fig. 2, a D. C. motor 101 having a separate field winding with terminals 103 and 105 is shown driving an A. C. tachometer generator 109 through mechanical connection 107. The field current for motor 101 is supplied from source 157, the positive terminal of the source being connected to field terminal 103 and the negative source being connected to terminal 105 through transistor 149 in the same manner as described with reference to Fig. 1. The output of tachometer generator 109 is an alternating voltage, the frequency of which is a direct function of the speed of rotation thereof. A standard frequency supply source 121 is shown, the frequency of which is equal to the frequency of tachometer 109 when motor 101 is operating at a desired speed. This standard supply source 121 may have provisions for varying the frequency of the output signal thereof, but this frequency must be highly stabilized.

The output signals of tachometer 109 and of standard supply source 121 are combined in a balanced modulator 111 which preferably is a bridge-type full wave rectifier having input terminals 117 and 119 and output terminals 113 and 115. The output voltage appearing across terminals 117 and 119 in addition to the fundamental frequency component will have one component having a frequency equal to the sum of tachometer 109 and source 121 and another equal to the differences of the frequencies of the tachometer and standard source. These signals are applied to a low pass filter 127, the function of which is to eliminate all components except that having a frequency equal to the difference of the frequencies of the tachometer 109 and standard source 121. This low pass filter may be of standard design; as shown, it comprises a 2-section π filter having series inductive elements 129a and 129b and shunt capacitive elements 131a, 131b and 131c and load resistor 136.

The output of filter 127 is applied to a differentiating network 133 comprising coupling rectifier 135, coupling capacitor 137, and shunt resistance element 139. The output voltage appearing across resistor 139 is coupled to a one-shot emitter-coupled multivibrator 147 using n-p-n junction transistors such as described by E. W. Sard in the IRE Convention Record of the 1954 National Convention, Part 2, page 119. The output voltage from this multivibrator will be of constant pulse width having a repetition rate dependent upon the frequency of trigger pulses applied thereto by differentiating network 133.

Assuming that the motor is meant to run at a speed of 1000 R. P. M. and that the tachometer delivers a frequency of 10 cycles per R. P. M., the tachometer output frequency at design motor speed would be 10,000 cycles per second. If the frequency of standard source 121 is set to 9900 cycles per second, the difference frequency at the design speed will be 100 cycles per second. If the pulse width of the one-shot multivibrator 147 is set at 10 milliseconds, then at design motor speed the individual pulses from the output of the multivibrator would join each other without interval. The transistor 149 would be biased to saturation at all times and the excitation current to the field winding of the motor would be at a maximum.

Should the speed of the motor decrease in value due to an increase in the load, the difference frequency would be less than 100 cycles per second and the output of the multivibrator 147 would be comprised of discrete output pulses so that the transistor 149 would be cut off during the intervals between pulses. The average field current through the motor field would therefore decrease in value, thereby increasing the motor speed until the design speed (1000 R. P. M. in this instance) is reached.

Under certain conditions it may be desirable to vary the motor speed between a given no-load speed and a given full-load speed. Under this circumstance the auxiliary field windings of the motor could be energized so that at full load no excitation would be furnished by the field winding incorporated in the system described above, the entire excitation for the motor being furnished by the other field windings. At the designed full-load speed the frequency of the standard supply source 121 would equal that of the tachometer generator 109, no pulses will be produced at the output of multivibrator 147 and maximum power would be delivered to the motor. Intermediate pulse rates corresponding to given motor speeds would thus be chosen automatically to balance the system for any given load.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a speed regulating system for a D. C. motor, motor speed indicating means having an output characteristic which is to be compared with a constant characteristic of a reference source to derive an error signal, the amplitude of a characteristic of said error signal being indicative of the deviation of the speed of said motor from a reference speed; transistor switch means coupling said motor to a source of direct current through the emitter to collector current conduction path thereof and selectively biased to one extreme of collector current conduction; pulse generating means adapted to generate pulses having a pulse width characteristic and a pulse repetition rate characteristic, said pulses being coupled to said transistor switch means to bias said transistor to the opposite extreme of collector current conduction; said pulse generating means being responsive to the magnitude of said output characteristic of said error signal to vary the average collector current of said transistor switch means to bring said motor speed back to said reference speed.

2. In a speed regulating system having a D. C. motor driving a tachometer with an output characteristic which is to be compared with a constant characteristic of a reference source to derive an error signal, the magnitude of the output characteristic of said error signal being indicative of the deviation of the speed of said motor from a reference speed; transistor switch means coupling said motor to a source of direct current through the emitter to collector current conduction path thereof and normally biased to one extreme of collector current cutoff or saturation; pulse generating means adapted to generate pulses having a pulse width characteristic and a pulse repetition rate characteristic, said pulses being coupled to said transistor switch means to bias said transistor to the opposite extreme of collector current cutoff or saturation, said pulse generating means being responsive to the amplitude of said error signal so as to vary the average collector current of said transistor switch means to bring said motor speed back to said reference speed.

3. In a speed regulating system for a D. C. motor, motor speed indicating means having an output characteristic which is to be compared with a constant characteristic of a reference source to derive an error signal, the magnitude of a characteristic of said error signal being indicative of the deviation of the speed of said motor from a reference speed; transistor switch means coupling said motor to a source of direct current through the emitter to collector current conduction path of said switch means and normally biased to one extreme of collector current cutoff or full conduction; pulse generating means adapted to generate pulses having a pulse width characteristic and a pulse repetition rate characteristic, said pulses being coupled to said transistor switch means to bias said transistor to the opposite extreme of collector current cutoff or full collector current conduction, said pulse generating means being responsive to the frequency of said error signal so as to vary the average collector current of said transistor to bring said motor speed back to said reference speed.

4. In combination; a direct current motor; first means driven by said direct current motor adapted to generate a signal, the magnitude of an output characteristic of said signal being variable in accordance with the speed of said motor; an electrical generator, the output signal of said generator having a constant reference characteristic of the same type as said characteristic of said first means; second means for comparing magnitudes of the output characteristics of said first means and said electrical generator and for producing an output signal having a characteristic with a magnitude equal to the difference of the magnitudes of said output characteristics of said first means and said generator; transistor switch means connecting a field circuit of said direct current motor to a source of power through the emitter to collector current conduction path thereof and normally biased to collector current cutoff; means coupled to said second means and to said transistor switch means for switching said transistor switch means to the extremes of full current conduction and collector current cutoff for periods functionally related to the magnitude of said output signal of said second means so as to vary the average current to said field winding in a sense that will vary said motor speed to maintain said magnitude of said output signal of said second means at a predetermined value.

5. In combination; a direct current motor; tachometer means driven by said direct current motor adapted to generate a signal having an output characteristic with a magnitude variable in accordance with the speed of said motor; an electrical generator having an output signal with a constant magnitude reference characteristic of the same type as said characteristic of said tachometer; first means comparing said output characteristics of said tachometer and said electrical generator and producing an output signal having one characteristic with a magnitude equal to the difference of the magnitudes of said output characteristics of said tachometer and said generator; pulse generating means adapted to generate pulses having a repetition rate characteristic and a pulse duration characteristic, one of said characteristics of said pulses being held constant while the other is variable in accordance with the magnitude of said one characteristic of said output signals of said first means; transistor switch means connecting a field winding of said direct current motor to a source of power through the emitter to collector current conduction path thereof and normally biased to one of the extremes of collector current cutoff or full collector current conduction; said pulses being coupled to said transistor means between the base electrode and an adjacent electrode of said transistor means to bias said transistor means to the opposite of the extremes of collector current conduction and collector current cutoff to said one extreme to which it is normally biased to vary the field winding current of said motor in a sense that will minimize the magnitude of said characteristic of said output signal of said first means.

6. In combination; a direct current motor; tachometer means driven by said direct current motor adapted to generate a direct voltage, the amplitude of said voltage being variable in accordance with the speed of said direct current motor; a reference voltage source; first means coupled to said tachometer means and to said reference voltage source, the output voltage from said first means being equal to the difference of the magnitudes of said tachometer means and said reference voltage source; triangular pulse generating means coupled to said first means adapted to generate triangular-wave pulses having time duration directly related to the magnitude of said output voltage of said first means; pulse clipping means coupling said triangular pulse generating means to transistor switch means and adapted to limit the amplitude of the output pulses of said triangular pulse generating means to a predetermined maximum; said transistor switch means connecting the field circuit of said direct current motor to a source of direct current through the emitter to collector current conduction path thereof; the output of said pulse clipping means being coupled between the base electrode and an adjoining electrode of said transistor switch means to bias said transistor switch means between full collector current conduction and collector current cutoff to vary the motor field current and motor speed to minimize said output voltage of said first means.

7. In combination; a direct current motor; first means driven by said direct current motor adapted to generate a direct voltage having an amplitude variable in accordance with the speed of said direct current motor; a reference voltage source; second means coupled to said tachometer means and to said reference voltage source, the output voltage from said second means being equal to the difference of the magnitudes of said tachometer means and said reference voltage source; triangular pulse generating means coupled to said second means adapted to generate triangular pulses having a duration directly related to the magnitude of said output voltage of said second means; pulse clipping means coupling said triangular pulse generating means to transistor switch means and adapted to limit the amplitude of the output pulses of said triangular pulse generating means to a predetermined maximum; said transistor switch means connecting the armature circuit of said direct current motor to a source of direct current through the emitter to collector current conduction path thereof; the output of said pulse clipping means being coupled between the base electrode and an adjoining electrode of said transistor switch means to bias said transistor switch means between collector current cutoff and full collector current conduction to vary the motor field current and motor speed to minimize said output voltage of said second means; said triangular pulse generating means comprising a bridge rectifier having input terminals and output terminals, and serially connected non-linear resistance means and linear resistance means connected across said output terminals, said triangular voltage being derived across said linear resistance means.

No references cited.